UNITED STATES PATENT OFFICE.

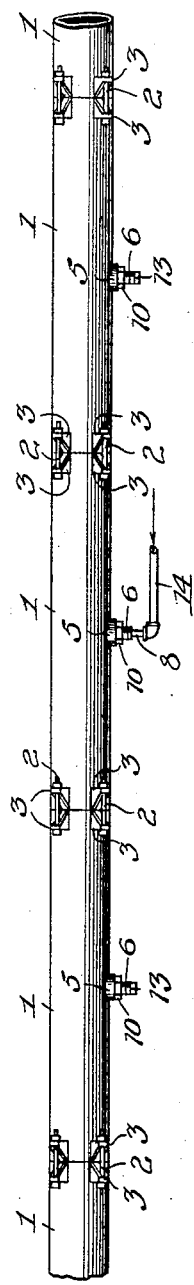

HERMAN A. POPPENHUSEN, OF HAMMOND, INDIANA, AND ARTHUR P. STRONG, OF CHICAGO, ILLINOIS, ASSIGNORS TO GREEN ENGINEERING COMPANY, OF EAST CHICAGO, INDIANA, A CORPORATION OF ILLINOIS.

ASH-CONVEYING SYSTEM.

1,324,980.      Specification of Letters Patent.      Patented Dec. 16, 1919.

Application filed May 23, 1919. Serial No. 299,214.

*To all whom it may concern:*

Be it known that we, HERMAN A. POPPENHUSEN, a citizen of the United States, residing at Hammond, in the county of Lake and State of Indiana, and ARTHUR P. STRONG, a citizen of the United States, residing at Chicago, in the county of Cook and State of Illinois, have invented new and useful Improvements in Ash - Conveying Systems, of which the following is a specification.

This invention relates to ash conveying or like systems. Among the objects of the invention is to provide the wall of that portion of the conveyer conduit at the discharge end thereof with means whereby a water spray connection may be readily made with the wall of the conduit at any one of a number of points so that the spraying point may be located the distance required from the discharge end of the conduit without disturbing the conduit connections. A further object of the invention is to make such means of material capable of being machined or operated upon by metal-cutting tools so that when incorporated in a hard iron conduit the water spray connection may be made with the wall thereof at any one of a number of points.

The invention consists further in the matters hereinafter described and more particularly pointed out in the appended claims.

In the accompanying drawings—

Figure 1 is a side elevational view of that portion of the conveyer conduit at the discharge end thereof, and showing applied to the wall of the same at a plurality of longitudinally spaced points members embodying the features of our invention for permitting a water spray connection to be made with the wall of the conduit at any one of such members;

Fig. 2 is a fragmentary longitudinal sectional view taken through the conduit and showing the manner in which one of the members is applied thereto; and Fig. 3 is a like view of the same parts, showing a water pipe attached to such member.

As shown in Fig. 1 of the drawings, that portion of the conveyer conduit at the discharge end thereof is formed of a plurality of pipe sections 1, 1, connected together at their abutting ends by clamp bolts 2, 2 engaging lugs 3, 3 on the outside of said sections. Such portion of the pipe line is usually horizontally arranged and supported high above the ground to discharge into the top of a high set tank or receptacle, in which the ash is collected for ultimate disposal. Said pipe sections are made of hard iron, that is, they are cast of a metal hard enough to withstand the abrasive action to which they are subjected while in use, but not soft enough to be operated upon by machining or the ordinary metal-cutting tools, thus making it impossible to drill or otherwise machine holes through the walls of the pipe sections to permit a water spray connection to be made directly therewith so as to inject a spray of water into the conduit at the distance required from the discharge end thereof. It is among the objects of our invention to provide in the wall of each of a number of such hard iron pipe sections means made of material capable of being machined so that a hole may be drilled therethrough and permit a water spray connection to be made therewith without disturbing the conduit connections. In the drawings, we have shown one form of construction by which this object may be accomplished, and, as illustrated, each of the pipe sections 1, 1 is provided in its wall at a point between its ends with a hole 4 formed in the wall of the pipe section at the time the same is cast. The hole 4 extends through the wall with its inner end opening into the interior of the pipe section and there provided with an enlarged portion preferably made conical in shape. The outer end of the hole 4 opens outward through the wall of the pipe section through a boss 5 cast on the outside of the section. This hole is rough and requires no finishing as by grinding. After the pipe section has been thus formed, a plug 6 of soft iron is inserted into the hole 4 from the inside of the pipe section, and has a conical head 7 to set in the complementary shaped inner portion of the hole 4. The stem 8 of the plug is preferably made cylindrical and is long enough to extend through the hole and outward beyond the boss 5, and is there provided with an external screw thread 9 to receive a soft iron nut 10, which is screwed against the boss 5, thereby drawing the conical end of the plug tightly into the like shaped portion of the hole 4 for securely holding the plug in place and sealing the hole 4. The plug 6 is provided with a passage 11 extending therethrough, the outer end of the passage having an internal screw thread to receive the screw-threaded end of a water pipe 12 or a common pipe plug 13, as shown in Figs. 2 and 3, respectively. The plug 6 being made of soft iron is capable of being machined or operated upon by metal-cutting tools, and therefore can have the passage 11 readily drilled therethrough and provided with screw threads for permitting attachment to be made thereto of either the pipe 12 or the pipe plug 13. When the pipe 12 is connected with one of the plugs 6, the other plugs in the pipe line are closed by the pipe plugs 13, as shown in Fig. 1, so that the material conveyed through the pipe line will be prevented from escaping out of the same through the passages 11 of the unused plugs 6. The pipe 12 is connected with another pipe or conduit 14 which leads to a suitable source of water supply, so that water may be injected into the pipe section 1 with which the pipes 12 and 14 are connected through the passage 11 in the plug 6 in the form of a spray. Should it be desired to attach the water spray connection to any one of the other pipe sections 1, 1, the pipe 12 is connected with the plug 6 in the pipe section selected and the other plugs closed by the pipe plugs 13, as shown in Fig. 1.

Ash conveying systems require the injection of water at a point usually adjacent the discharge end of the pipe line for the purpose of quenching hot ashes fed to the system before discharging into the receptacle or tank, but more particularly for wetting the ashes sufficiently to lay any dust incidental in handling. The location of the spray from the discharge end of a conveyer conduit varies, depending upon the nature of the ash being handled and the rate of conveying. Ash having a preponderance of very fine material requires the water spray to be located farther away from the point of discharge than a coarser ash, in order to give time for the ash and water to mix while in transit. A coarse clinkering ash will require less water and therefore the spray may be located nearer the discharge end of the pipe line. On the other hand, different locations must be tried, and often when coal conditions change a location satisfactory under one condition of coal is not satisfactory under other conditions. It is therefore possible by our invention to provide as many of the pipe sections 1, 1 with as many plugs 6, 6 as may be required so that the spraying point may be changed from time to time to meet the conditions encountered in the use of the system, with no more labor and expense required than necessary to change the pipe connection from one plug 6 to another, and thus avoid disconnecting the pipe sections to permit that to be done, this in itself being an advantage when it is recalled that the pipe sections 1, 1 are usually supported high above the ground with relatively few supports. While in the drawings we have shown each of a number of the pipe sections 1, 1 provided with only one plug 6 and the pipe sections consecutively connected together, it is to be understood that any one or more of such pipe sections may be provided in the wall thereof with as many plugs as may be desired so that a water spray may be located at any one of a number of points in the length of the pipe section, and such pipe sections may have interposed between them others having no plugs. Moreover, while we have shown and described herein in detail one form of structure embodying the features of our invention, yet the details of construction and arrangement of parts shown may be variously changed and modified without departing from the spirit and scope of our invention.

We claim as our invention:

1. In a conduit of an ash conveying or like system having the portion at the discharge end thereof made of a material of such hardness that it cannot be operated upon by machining, such portion of said conduit being provided in the wall thereof at a plurality of longitudinally spaced points with means made of material capable of being machined so that a water spray connection may be made with the wall of said conduit at any one of said points for varying the location of the water spray from the discharge end of the conduit.

2. In a conduit of an ash conveying or like system having the portion at the discharge end thereof made of a material of such hardness that it cannot be operated upon by machining, such portion of said conduit being provided in the wall thereof with a plurality of holes spaced apart longitudinally of the conduit, and plugs made of material capable of being machined secured in said holes so that a water spray connection may be made with any one of said plugs for varying the location of the water spray from the discharge end of the conduit.

3. In a conduit of an ash conveying or like system having a portion thereof formed of a plurality of connected pipe sections made of a material of such hardness that they cannot be operated upon by machining, at least one of said pipe sections being provided at one point in its length with a portion made of material capable of being machined for the purpose of permitting a water spray connection to be made therewith without disconnecting such pipe section from the others in the conduit.

4. A pipe section made of a material of such hardness that it cannot be operated upon by machining, said pipe section having a hole formed in the wall thereof at the time the pipe section is cast, a plug of material capable of being machined extending through and secured in said hole and provided with a water passage extending therethrough.

5. A pipe section made of a material of such hardness that it cannot be operated upon by machining, said pipe section having a hole formed in the wall thereof at the time the pipe section is cast, a plug made of material capable of being machined extending through and secured in said hole and being larger at its inner than its outer end, said plug having a water passage extending therethrough.

In testimony that we claim the foregoing as our invention, we affix our signatures, this 7th day of May, A. D. 1919.

HERMAN A. POPPENHUSEN.
ARTHUR P. STRONG.